US011832730B2

(12) United States Patent
Donati

(10) Patent No.: US 11,832,730 B2
(45) Date of Patent: Dec. 5, 2023

(54) BASE FOR AN OSCILLATING SEAT

(71) Applicant: Donati S.p.A., Rodengo Saiano (IT)

(72) Inventor: Armando Donati, Rodengo Saiano (IT)

(73) Assignee: DONATI S.P.A., Rodengo Saiano (IT)

( * ) Notice: Subject to any disclaimer, the term of this patent is extended or adjusted under 35 U.S.C. 154(b) by 210 days.

(21) Appl. No.: 17/432,503

(22) PCT Filed: Mar. 3, 2020

(86) PCT No.: PCT/IB2020/051792
§ 371 (c)(1),
(2) Date: Aug. 20, 2021

(87) PCT Pub. No.: WO2020/178730
PCT Pub. Date: Sep. 10, 2020

(65) Prior Publication Data
US 2022/0087426 A1 Mar. 24, 2022

(30) Foreign Application Priority Data
Mar. 6, 2019 (IT) .......................... 102019000003255

(51) Int. Cl.
*A47C 3/026* (2006.01)
*F16M 11/22* (2006.01)
(52) U.S. Cl.
CPC ............. *A47C 3/026* (2013.01); *F16M 11/22* (2013.01); *F16M 2200/08* (2013.01)
(58) Field of Classification Search
CPC .... F16M 11/22; F16M 2200/08; A47C 3/026; A47B 13/02; A47B 13/023; A47B 2013/026

USPC ..... 248/188.1, 188.2, 188.7, 188.8; 297/311, 297/313
See application file for complete search history.

(56) References Cited

U.S. PATENT DOCUMENTS

| 2,126,707 A | 8/1938 | Schmidt | |
|---|---|---|---|
| 5,524,967 A * | 6/1996 | Glockl | A47C 3/02 297/344.1 |
| 7,547,067 B2 * | 6/2009 | Keilhauer | A47C 3/02 297/313 |
| 9,763,520 B1 | 9/2017 | Pan | |
| 2006/0138840 A1 * | 6/2006 | Keilhauer | A47C 3/02 297/344.1 |
| 2011/0175414 A1 * | 7/2011 | Asbjornsen | A47C 3/0252 248/371 |
| 2019/0116979 A1 * | 4/2019 | Kamiya | A47C 9/025 |
| 2019/0200769 A1 * | 7/2019 | Aono | A47C 9/002 |
| 2022/0125203 A1 * | 4/2022 | Jun | A47C 3/026 |

OTHER PUBLICATIONS

International Search Report, issued in PCT/IB2020/051792, dated Apr. 29, 2020, Rijswijk, Netherlands.

* cited by examiner

*Primary Examiner* — Alfred J Wujciak
(74) *Attorney, Agent, or Firm* — ArentFox Schiff LLP; Michael Fainberg

(57) ABSTRACT

A support base for a tilting seat having a coupling body, a support body having a central portion, and a plurality of flexible components that are structurally separable and elastically yielding is provided. The flexible components are arranged between the coupling body and the central portion and meet in compression according to oscillations of a piston rod of the tilting seat.

9 Claims, 6 Drawing Sheets

BASE FOR AN OSCILLATING SEAT

CROSS-REFERENCE TO RELATED APPLICATIONS

This application is a National Phase Application of PCT International Application No. PCT/IB2020/051792, having an International Filing Date of Mar. 3, 2020 which claims priority to Italian Application No. 102019000003255 filed Mar. 6, 2019, each of which is hereby incorporated by reference in its entirety.

FIELD OF THE INVENTION

The present invention relates to the field of components for seats such as chairs, stools or armchairs, and in particular relates to a support base for seats of this kind.

BACKGROUND OF THE INVENTION

This field is characterized by the constant introduction of new solutions, both aesthetic and functional; in particular, the operators in the field are continuously searching for innovative solutions which are able to guarantee the user greater comfort when using the seats.

For example, various solutions are known which provide a support base which allows the seat to oscillate; this movement is particularly appreciated in that it allows the user to carry out small oscillations of the pelvis, with considerable relaxation of the osseous and muscular system, while remaining seated.

However, the solutions known today have several disadvantages, such as structural complexity and difficulty in assembly.

SUMMARY OF THE INVENTION

The aim of the present invention is that of providing a support base for a seat, for example a stool, a chair or an armchair, which satisfies the requirements of the field and overcomes the described disadvantages.

The above aim is achieved by a seat as described and claimed herein.

BRIEF DESCRIPTION OF THE DRAWINGS

The features and advantages of the seat according to the present invention will become evident from the following description, given by way of non-restrictive example and in accordance with the accompanying drawings, in which.

DETAILED DESCRIPTION

Figure 1:
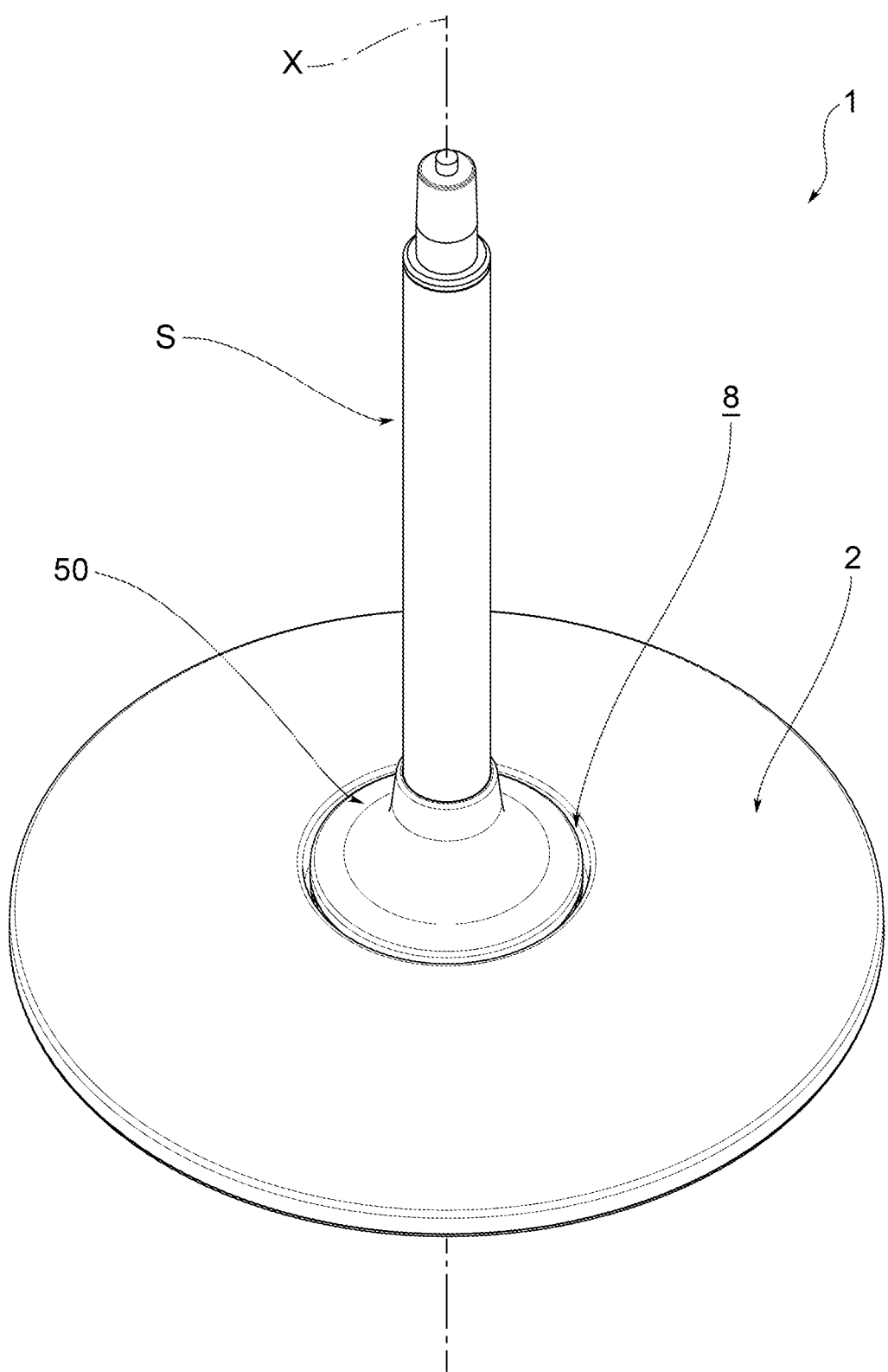
FIG. 1 shows a support base according to a first embodiment of the present invention.
Figure 2:
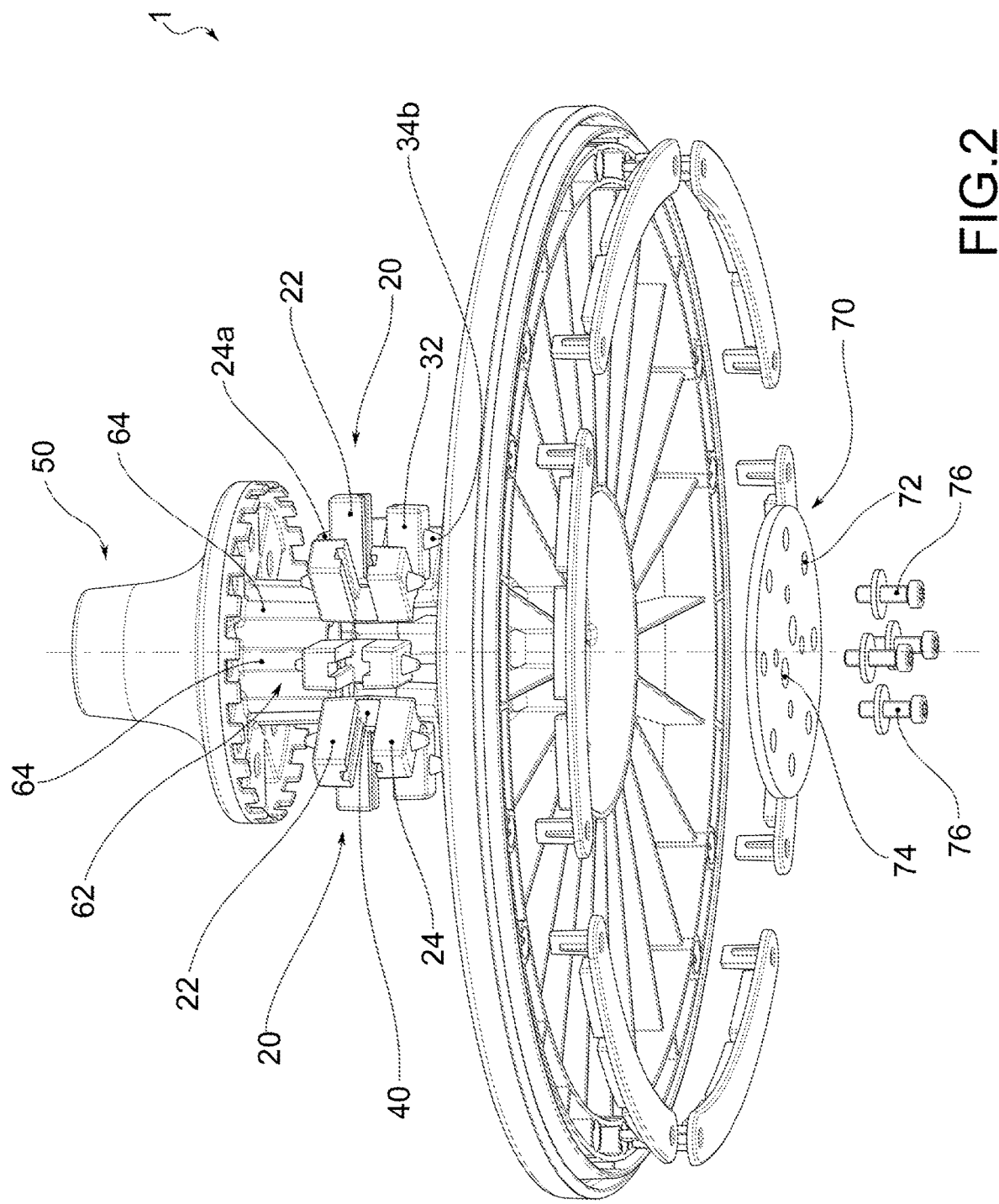
FIG. 2 is an exploded view of the support base in FIG. 1.
Figure 3:
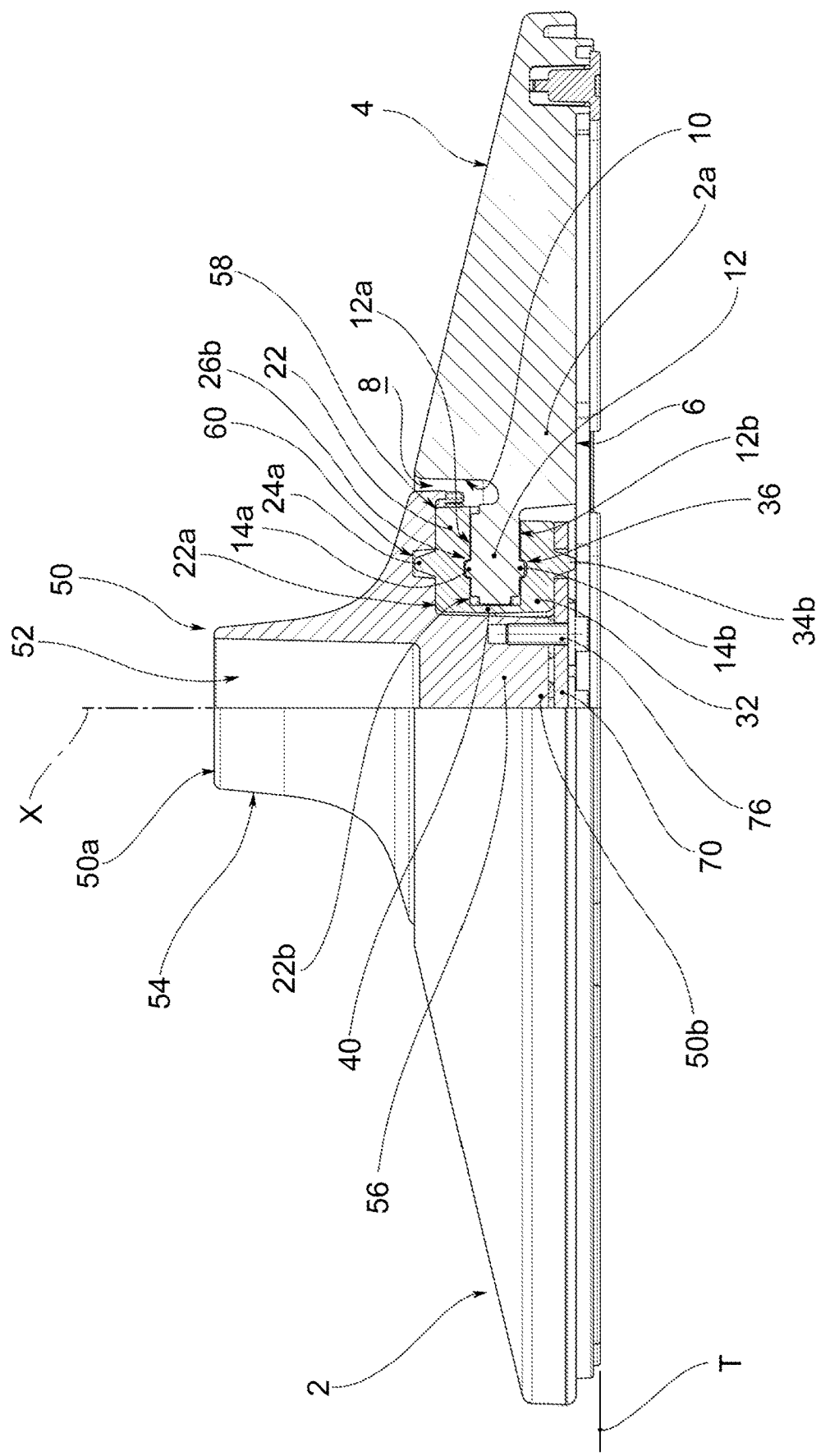
FIG. 3 is a sectional view of the support base in FIG. 1.

According to one embodiment of the invention (FIGS. 1 to 3), the reference sign 1 is intended to indicate, as a whole, a support base for a seat, such as a stool, a chair or an armchair.

The support base 1 comprises a support body 2, for example in the shape of a truncated cone, which has an upper face 4 and a lower face 6 which faces a support plane T on which the support base 1 is supported.

The support body 2 comprises a central portion 2a which has a passage 8 which extends from the upper face 4 to the lower face 6 along a main axis X and is open at said faces 4, 6. The main axis X is vertical, i.e. orthogonal to the ground plane T.

The passage 8 has a lateral surface 10, which is for example cylindrical.

The support body 2 also comprises at least one protrusion 12, which is integral with the central portion 2a and protrudes radially inside from the lateral surface 10 of the passage 8.

According to one preferred embodiment, the protrusion 12 consists of a single element which extends circumferentially in a continuous manner.

According to further embodiments, a plurality of protrusions is provided which are circumferentially separated.

Said at least one protrusion 12 is preferably made in a single piece, for example by means of molding or injection molding, with the central portion 2a.

According to one embodiment, said at least one protrusion is in itself an element which is separate from the central portion, applied to the central portion and made integral therewith.

Said at least one protrusion 12 has an upper face 12a and a lower face 12b which is axially opposite the upper face 12a.

Said at least one protrusion 12 preferably comprises an upper projection 14a, protruding axially from the upper face 12a, and/or a lower projection 14b, protruding axially from the lower face 12b.

The support base 1 also comprises a plurality of flexible components 20, which are in themselves structurally separable, arranged in the passage 8 of the support body 2, arranged circumferentially, and preferably spaced from one another. Each flexible component 20 is engaged with the protrusion 12 of the support body 2.

Each flexible component 20 comprises a first block 22, which consists for example of a single body made of an elastic material, typically in the shape of a prism; for example, the first block 22 is engaged with the upper projection 14a of the protrusion 12.

The first block 22 has an upper face 22a and a lower face 22b which is axially opposite the upper face 22a.

The first block 22 preferably has an upper protuberance 24a, protruding from the upper face 22a, and/or a lower recess 26b made in the lower face 22b.

The first block 22 is engaged with the protrusion 12 as a result of the engagement between the upper projection 14a of the protrusion 12 and the lower recess 26b of the first block 22.

Moreover, the flexible component 20 preferably comprises a second block 32, which consists for example of a single body made of an elastic material, typically in the shape of a prism; for example, the second block 32 is engaged with the lower projection 14b of the protrusion 12.

The second block 32 is spaced axially from the first block 22.

The second block 32 has an upper face 32a and a lower face 32b which is axially opposite the upper face 32a.

The second block 32 preferably has a lower protuberance 34b, protruding from the lower face 32b, and/or an upper recess 36a made in the upper face 32a.

The second block 32 is engaged with the protrusion 12 as a result of the engagement between the lower projection 14b of the protrusion 12 and the upper recess 36a of the second block 32.

Moreover, the flexible component 20 preferably comprises a connecting portion 40, for example in the form of a thin plate, which connects the first block 22 to the second block 32.

Consequently, the flexible component 20 has a C-shape which is open towards the protrusion 12 such that the connecting portion 40 is arranged radially inside with respect to the protrusion 12.

Said connecting portion 40 is preferably made of an elastic material.

The flexible component 20 is preferably made in a single piece, for example by means of molding or injection molding, in an elastic material, for example SBR rubber (styrene-butadiene rubber).

The support body 1 also comprises a coupling body 50 which extends axially between an upper end 50a and a lower end 50b which is closed.

The coupling body 50 preferably comprises a coupling portion 54, provided on the upper end 50a of the opening of a rod seat 52 for coupling a piston rod of the seat, and an engagement portion 56 which terminates at the lower end 50b, is contained in the passage 8 of the support body 2 and is engaged with the flexible components 20.

The engagement portion 56 has a notch which is radial with respect to the coupling body 54, has a notch surface 58, and lies on an imaginary plane which is orthogonal with respect to the main axis X, in which coupling body a notch recess 60 is made.

The notch recess 60 receives the upper protuberance 24a of the flexible components 20, thereby assuring the engagement, according to one embodiment, between the coupling body 50 and the flexible components 20, and in particular with each first block 22.

Moreover, the support base 1 comprises an engagement plate 70 provided with a plurality of first holes 72 and a plurality of second holes 74.

Said first holes 72 are preferably arranged such that the respective centers are arranged on an imaginary circumference and receive the lower protuberance 34b of the second block 32 of each flexible component 20.

Screws 76 which fix the engagement plate 70 to the lower end 50b of the coupling body 50 pass through said second holes 74, the centers of which are preferably arranged inside said imaginary circumference.

This produces the engagement, according to one embodiment, between the coupling body 50 and the flexible components 20, and in particular with each second block 32.

The engagement portion 56 also has a lateral surface 62 which extends axially.

The lateral surface 63 preferably has a plurality of axial grooves 64 which succeed one another circumferentially. Each axial groove 64 receives the connecting portion 40 of the relevant flexible component 20.

Figure 4:
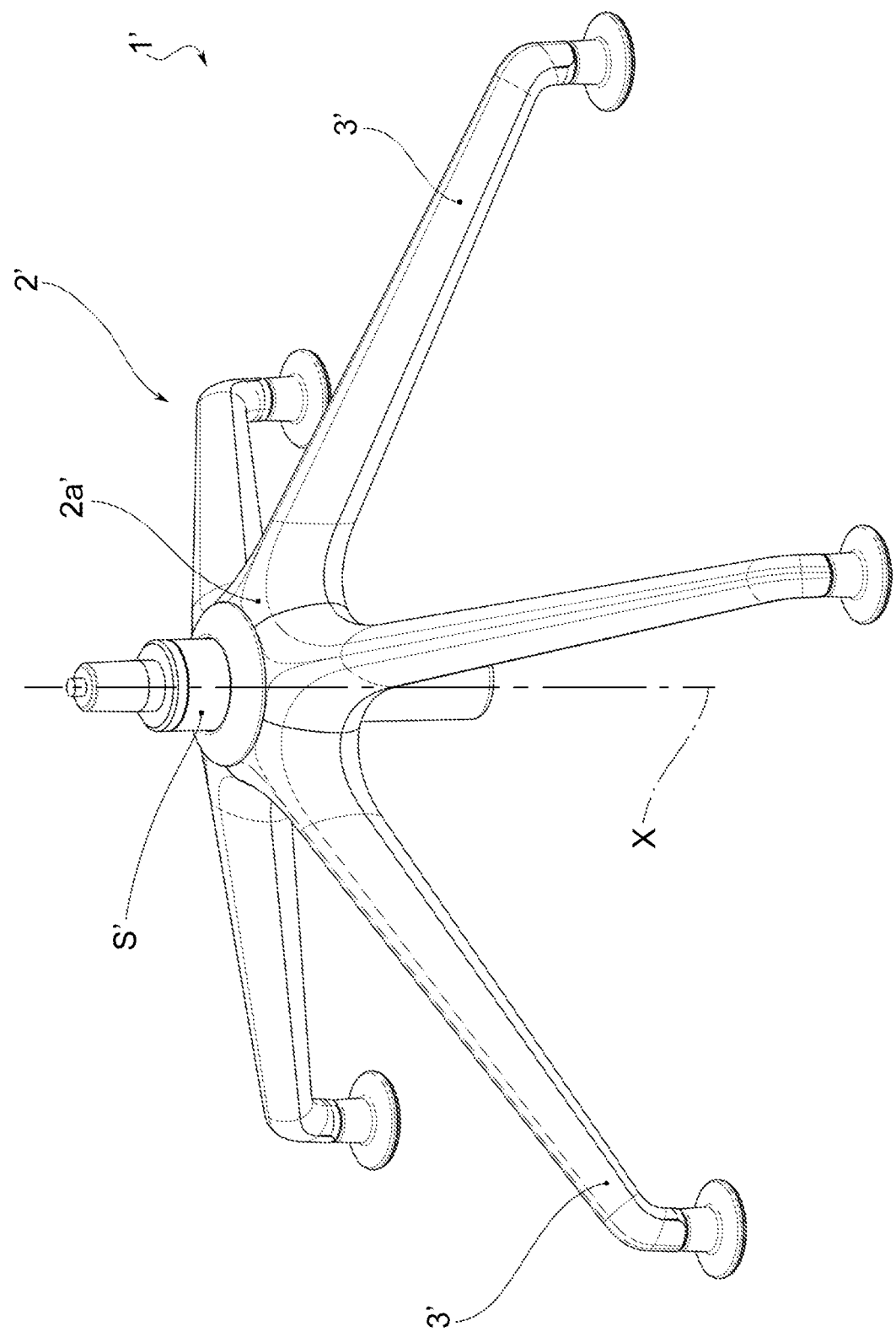
FIG. 4 shows a support base according to a further embodiment of the present invention.
Figure 5:
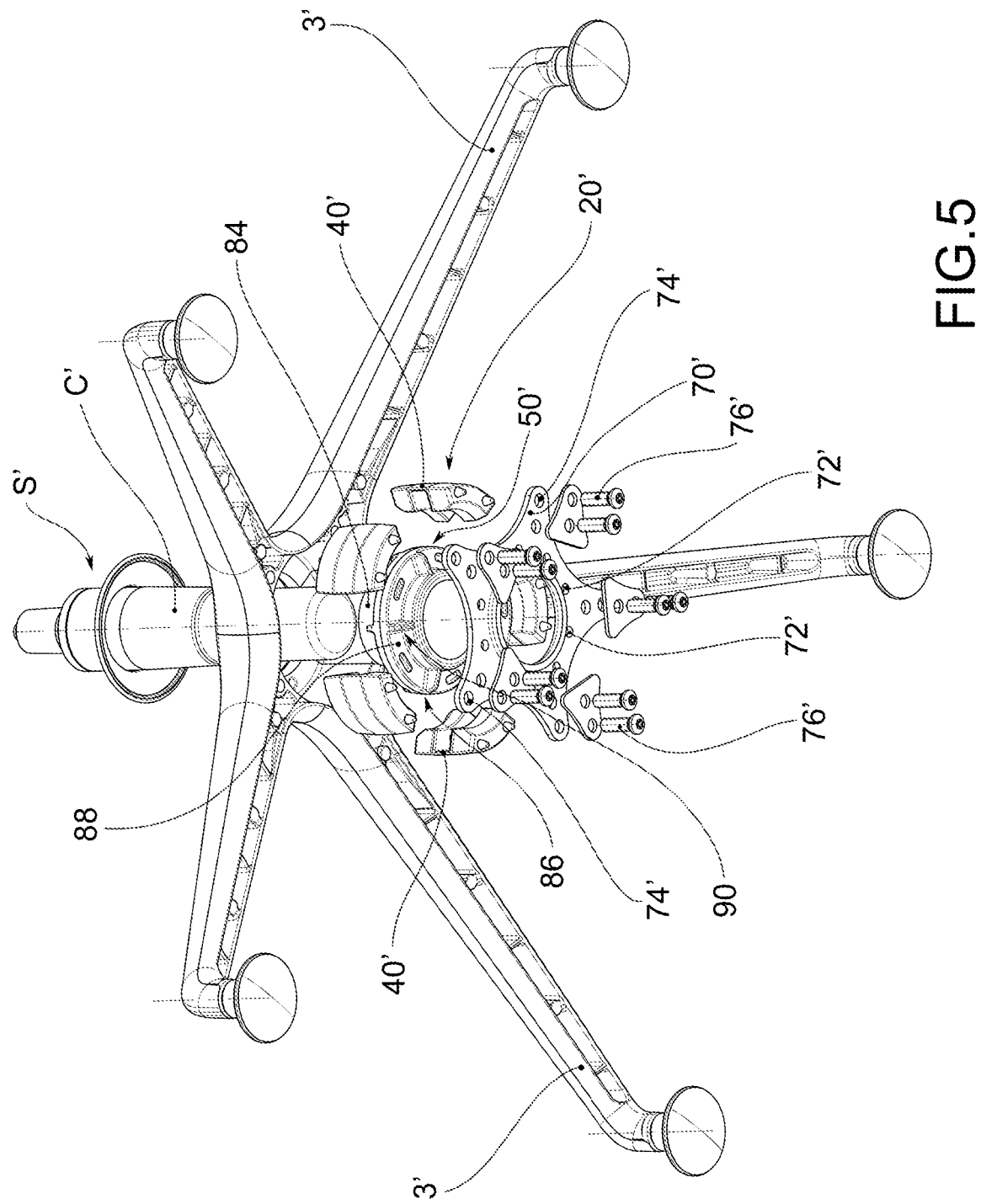
FIG. 5 is an exploded view of the support base in FIG. 4.
Figure 6:
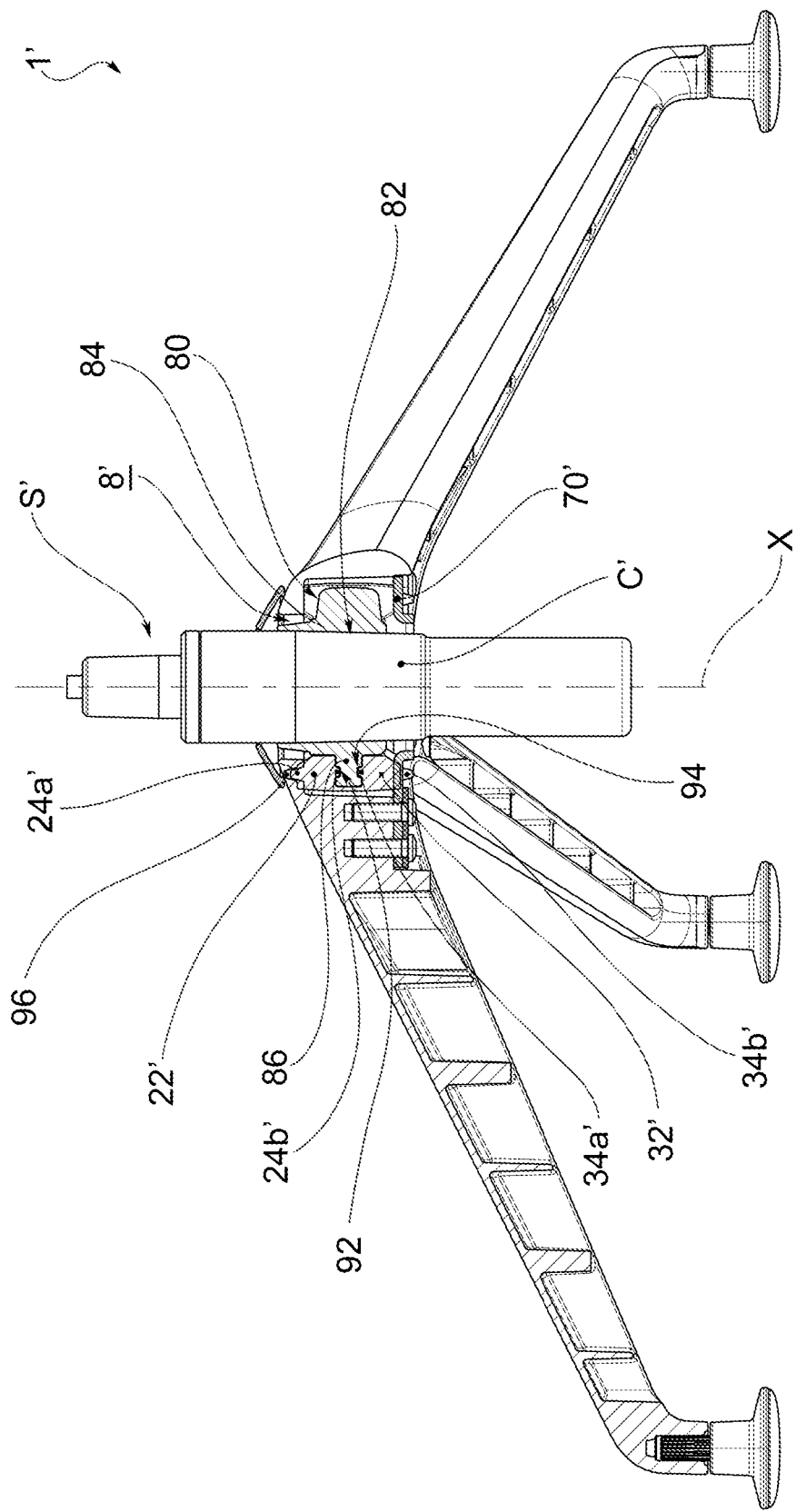
FIG. 6 is a sectional view of the support base in FIG. 4.

According to a further embodiment of the invention (FIGS. 4 to 6), a support base 1' comprises a support body 2' which consists of a plurality of spokes 3', for example five in number.

The spokes 3' converge towards a central portion 2a', where a passage 8' is made which has a main axis X, in which passage a piston rod S' of the seat is inserted.

The support base 1' also comprises a coupling body 50' provided with a through-hole in the shape of a truncated cone, which is tapered towards the base, for insertion and engagement with a truncated cone-shaped portion C' of the piston rod S'.

The coupling body 50' comprises a first body 84 provided with the axial hole 82, and a flange 86 protruding radially outside from the first body 84, with which said flange is integral.

For example, the flange 86 is made in a single piece with the first body 84, for example in aluminum, for example by means of die-casting.

The flange 86 comprises a crown 88, protruding radially outside from the first body 84, and a plurality of axial baffles 90, also protruding radially outside from the first body 8, above and below the crown.

The baffles 90 divide the crown 88 into sectors; in each sector an upper seat 92 is provided, which is recessed with respect to the upper surface of the crown 86, and a lower seat 94 is provided, which is recessed with respect to the lower surface of the crown 86.

According to one preferred embodiment, the flange 86 consists of a single element which extends circumferentially in a continuous manner. According to further embodiments, a plurality of flange parts is provided which are separated circumferentially.

The support base 1' also comprises a plurality of flexible components 20', which are in themselves structurally separable, contained inside the passage 8', arranged circumferentially around the coupling body 50', preferably spaced from one another, and engaged with said coupling body 50'.

Each flexible component 20' according to the present embodiment is structurally analogous to the flexible component 20 described for the previous embodiment.

Said flexible component 20' therefore has a first block 22', an upper protuberance 24a' and/or a lower protuberance 24b'.

The lower protuberance 24b' is inserted into the upper seat 92 of the flange 86, whereas the upper protuberance 24a' is inserted into an internal seat 96 made inside the central portion 2a' of the support body 2'.

The flexible component also comprises a second block 32', a lower protuberance 34b' and/or an upper protuberance 34a'.

The upper protuberance 34a' is inserted into a lower seat 94 of the flange 86.

The support base 1' also comprises an engagement plate 70' provided with a plurality of first holes 72' and a plurality of second holes 74'.

Said first holes 72' are preferably arranged such that the respective centers are arranged on an imaginary circumference and receive the lower protuberance 34b' of the second block 32' of each flexible component 20'.

Screws 76' which fix the engagement plate 70' to the central portion 2a' of the support body 2' pass through said second holes 74', the centers of which are preferably arranged outside said imaginary circumference.

This produces the engagement, according to one embodiment, between the central portion 2a' of the support body 2' and the flexible components 20', and in particular with each second block 32'.

Moreover, the flexible component 20' preferably comprises a connecting portion 40', for example in the form of a thin plate, which connects the first block 22' to the second block 32'.

Consequently, the flexible component 20' has a C-shape which is open towards the flange 86 such that the connecting portion 40' is arranged radially outside with respect to the flange 86.

According to the invention, the piston rod S, S' of the seat can cause an oscillation about the main axis, in any direction. This consequently oscillates the coupling body, thus causing a selective compression of the flexible elements against the central portion of the support body of the base.

In summary, according to the invention, a support base 1, 1' for a tilting seat, such as a stool, a chair or an armchair, comprises:

- a coupling body 50, 50' provided with a rod seat 52, 52' for engagement with a piston rod S, S' of the seat;
- a support body 2, 2' having a central portion 2a, 2a' provided with a passage 8, 8' with a main axis X;
- a plurality of flexible components 20, 20', structurally separable and elastically yielding, each made in a single piece, arranged circumferentially around the coupling body 50, 50', arranged between the coupling body 50, 50' and the central portion 2a, 2a', suitable to meet in compression according to the oscillations of the piston rod S, S',
- wherein each flexible component 20, 20' comprises a first elastically yielding block 22, 22', a second elastically yielding block 32, 32' spaced axially from the first block 22, 22', and a connecting portion 40, 40' connecting said blocks 22, 22'; 32, 32',
- wherein the central portion 2a comprises a protrusion 12 protruding radially inside the passage 8 or the coupling body 50' comprises a flange 86 protruding radially outside,
- wherein each flexible component 20 is applied to the protrusion 12 of the central portion 2a or each flexible component 20' is applied to the flange 86 of the coupling body 50';
- and wherein the first block 22, 22' of each flexible component 20, 20' is positioned above the protrusion 12 or the flange 86, and the second block 32, 32' of each flexible component 20, 20' is positioned below the protrusion 12 or the flange 86.

Innovatively, the support assembly of the piston rod according to the present invention satisfies the needs of the field since it allows a tilting seat to be provided, and simultaneously overcomes the disadvantages described with reference to the prior art since assembly is very simple.

It is clear that a person skilled in the art, in order to satisfy current needs, could modify the support base described above entirely within the scope of protection as defined in the following claims.

The invention claimed is:

1. A support base for a tilting seat, comprising:
    a coupling body provided with a rod seat for engagement with a piston rod of the tilting seat;
    a support body having a central portion provided with a passage with a main axis;
    a plurality of flexible components, structurally separable and elastically yielding, each flexible component of said plurality of flexible components being made in a single piece, the flexible components being circumferentially arranged around the coupling body, between the coupling body and the central portion, and configured to meet in compression according to oscillations of the piston rod,
    wherein each flexible component comprises a first elastically yielding block, a second elastically yielding block that is axially spaced apart from the first elastically yielding block, and a connection portion that connects said first and second elastically yielding blocks,
    wherein the central portion comprises a protrusion that projects radially internally in the passage,
    wherein each flexible component is attached to the protrusion of the central portion; and
    wherein the first elastically yielding block of each flexible component is arranged above the protrusion and the second elastically yielding block of each flexible component is arranged below the protrusion.

2. The support base of claim 1, wherein each flexible component is made of an elastic material.

3. The support base of claim 2, wherein said elastic material is styrene-butadiene rubber (SBR).

4. The support base of claim 1, wherein each flexible component is C-shaped.

5. The support base of claim 1, wherein the first elastically yielding block comprises an upper protuberance or an upper recess for engagement with the coupling body.

6. The support base of claim 1, wherein the first elastically yielding block comprises a lower recess for engagement with the central portion.

7. The support base of claim 1, wherein the second elastically yielding block comprises an upper recess for engagement with the central portion.

8. The support base of claim 1, wherein the second elastically yielding block comprises a lower protuberance for engagement with the coupling body.

9. The support base of claim 1, wherein the coupling body comprises an engagement portion provided with a plurality of axial grooves, and wherein the connection portion of each flexible component is housed in a respective axial groove.

* * * * *